June 23, 1925.　　　　　　　　　　　　　　　　1,543,008
H. A. HANSON ET AL
MOTOR VEHICLE DRIVING MECHANISM
Filed July 3, 1924
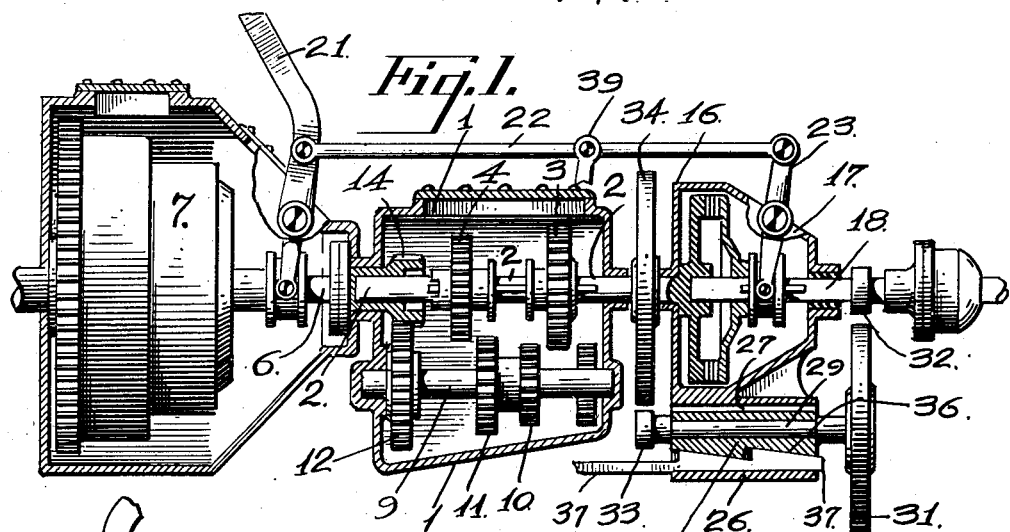
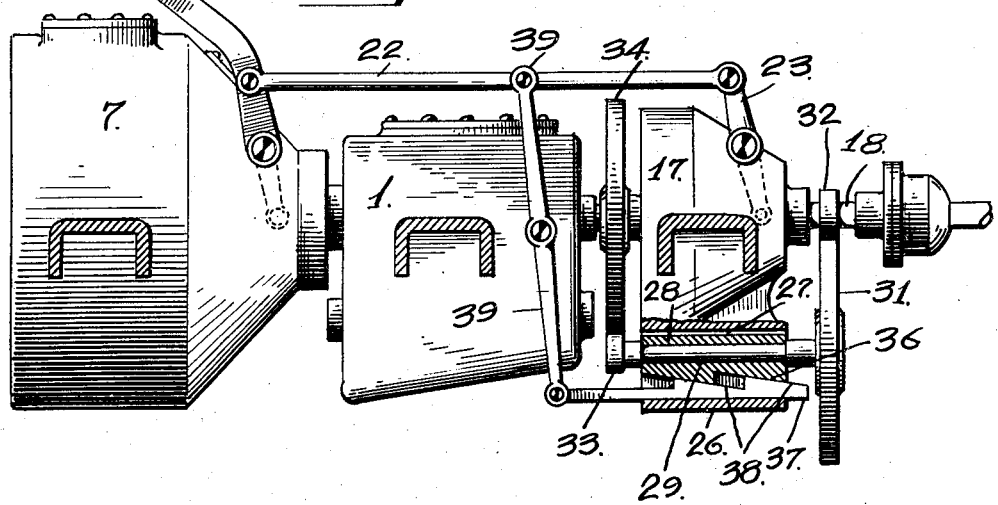
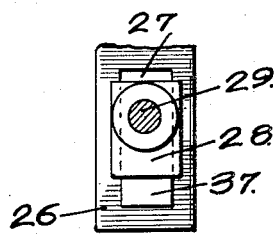
INVENTORS.
H. A. HANSON.
V. F. ZOHODIAKIN.
BY Arthur L. Slee
ATTY.

Patented June 23, 1925.

1,543,008

UNITED STATES PATENT OFFICE.

HARRY A. HANSON AND VICTOR F. ZOHODIAKIN, OF OAKLAND, CALIFORNIA.

MOTOR-VEHICLE DRIVING MECHANISM.

Application filed July 3, 1924. Serial No. 724,114.

*To all whom it may concern:*

Be it known that we, HARRY A. HANSON and VICTOR F. ZOHODIAKIN, a citizen of the United States and a subject of Russia, respectively, residing in the city of Oakland, in the county of Alameda and State of California, have invented a new and useful Improvement in a Motor-Vehicle Driving Mechanism, of which the following is a specification.

Our invention relates to improvements in motor vehicle driving mechanism wherein a second transmission and a frictional speed reducing mechanism operate in conjunction with the present clutch and transmission of a motor vehicle to reduce the speed of the variable speed gears of the transmission whereby shifting of the same, while either the vehicle or the motor thereof is in operation may be facilitated.

In the present state of the art motor vehicles are provided with a variable speed transmission, containing several sets of variable speed gears, a portion of which are directly connected to the propeller shaft of the vehicle, while the remaining portion of said variable gears are directly connected to the motor of the vehicle through the clutch thereof.

In order to obtain various gear ratios between the motor and the rear or driving wheels of the vehicle, it is necessary to disconnect a portion of the variable speed gears from the motor by releasing the clutch, and then by means of suitable shifting means, shifting the gear connections. This is easily accomplished while a portion of the gears are being rotated through the propeller shaft by the moving vehicle and before the remaining portion of said gears, which had previously been rotated through the clutch by the motor, come to rest, as the variation or difference in speed between the gears connected to the clutch and the gears connected to the propeller shaft is not so very great.

But when it is desired to shift from high to low speed, or when coasting down hill with the motor of the vehicle inactive, the difference in speed between the gears on the main and counter-shafts is so great that it is practically impossible at times to shift the gears.

The present invention has for its principal object the provision of means whereby rotation of all of the gears of the transmission may be prevented to eliminate the great difference in speed between the two sets of variable speed gears, whereby the process of shifting the said gears may be facilitated.

Another object of the invention is to provide improved means for rotating the one set of variable speed gears at a very low rate of speed whereby the teeth of one set of gears may be slowly moved past the spaces of the remaining set of gears thereby further facilitating the gear shifting process.

A further object is to provide means for simultaneously disconnecting both sets of variable speed gears from the motor and propeller shaft and then connecting one set of said variable speed gears with the propeller shaft whereby one set of gears may be slowly rotated while the other set remains stationary thereby further facilitating the gear shifting process.

We accomplish these and other objects by means of the improved device disclosed in the drawings, forming a part of the present specification wherein like characters of reference are used to designate similar parts throughout the said specification and drawings, and in which—

Fig. 1 is a broken vertical sectional view of a variable speed transmission mechanism and clutch of a motor vehicle disclosing my improvement attached thereto;

Fig. 2 is a broken side elevation, partly in section, of Fig. 1 disclosing the operating connections; and Fig. 3 is an enlarged broken detailed view.

Referring to the drawings the numeral 1 is used to designate in general a variable speed transmission mechanism of a motor vehicle, provided with the usual main shaft 2 having slidably mounted thereon one set of variable speed gears 3 and 4, the gear 4 being arranged, in the usual manner, to engage the shaft 6 of a standard clutch 7 of any suitable motor vehicle type.

The transmission 1 is also provided with the usual counter-shaft 9 having the second set of gears 10, 11 and 12 which are fixed to said shaft 9, the gear 12, following the usual practice, meshing at all times directly with a pinion 14 on the clutch shaft 6.

The rear end of the main transmission shaft 2 is connected to a suitable clutch member 16 of a second clutch 17 which is interposed between the transmission 1 and the propeller shaft 18.

Both clutches are arranged to be actuated simultaneously by means of the usual pedal 21 which is attached directly to the main clutch 7 and by means of a suitable connecting rod 22 to the operating lever 23 of the second clutch 17, so that when both of these clutches 7 and 17 are released, both sets of variable gears of the transmission 1 will be released from the motor and propeller shafts while both of said motor and propeller shafts are in motion, and their rotation thereby prevented.

The lower portion 26 of the clutch housing of the clutch 17 is provided with a vertically disposed slot 27 having a journal 28 mounted therein, and a counter-shaft of a preferably frictional speed reduction mechanism is rotatably mounted within said journal 28. The counter-shaft 29 is provided at one end with a large frictional disc 31 which is arranged to engage a frictional pinion 32 on the propeller shaft 18 while the opposite end of said shaft 29 is provided with a small frictional pinion 33 which is arranged to engage a frictional disc 34 on the main shaft 2 of the transmission 1.

As the slot 27 in the lower portion 26 of the clutch housing 17 is preferably vertically disposed, the disc and pinion 31 and 33 are normally held by gravity, in disengaging relation with the pinion and disc 32 and 34 on the propeller shaft 18 and the main shaft 2 respectively, the purpose of which will hereinafter be more fully set forth.

In order to engage these frictional pinions and discs the lower surface of the journal 29 is provided with inclined surfaces 36 which are engaged by the inclined surfaces or wedges 38 of a member 37 slidably mounted within the slot 27 below the journal 28 therein. One end of said wedge member 37 is pivotally connected to one end of a lever 39 pivotally mounted upon the outer side of the transmission 1 while the other end of said lever 39 is connected to the connecting rod 22 which connects the clutch pedal 21 with the operating lever 23 of the second clutch 17, so that when said clutch pedal 21 is operated it will not only actuate both clutches 7 and 17 simultaneously but will also actuate the wedge member 37 to move the several frictional discs and pinions into engagement and thereby connect the main shaft 2 of the transmission 1, and the gears 3 and 4 thereon, with the propeller shaft 18 and rotate said gears 3 and 4 at a greatly reduced speed while the other gears of the transmission will remain stationary, their rotation being prevented by the releasing of the clutch 7.

In operation, as above described, the operation of the clutch pedal 21 will disconnect both sets of variable speed gears of the transmission 1 from the motor and the propeller shaft by means of the clutches 7 and 17 on either end of said transmission. This will prevent the further rotation of said gears. If the vehicle is coasting and the motor of the vehicle is inactive, in present practice it would be impossible to shift gears for the reason that the gears 3 and 4 would be rotated at a rapid speed by the propeller shaft 18 while the gears 10 and 11 would be stationary. But with the use of the present invention one set of gears of the transmission would be stationary and the other set of gears slowly rotating and consequently the shifting of said gears could be easily accomplished. This is for the purpose of permitting shifting of the gears to low gear and engaging an inactive motor to serve as a brake to check the progress of the vehicle down a steep hill where the braking mechanism is inadequate.

The clearance between the disc and pinion 31 and 33 respectively of the counter-shaft 29 is purposely arranged to prevent engagement of said disc and pinion 31 and 33 with the pinion and disc 32 and 34 of the propeller shaft and main shaft 18 and 2 respectively, until the variable speed gears of the transmission 1 are entirely released from their driving elements. The purpose of this arrangement is to provide a complete release of the variable speed gears from their driving elements before the gears on the main shaft 2 are rotated at a greatly reduced speed by operation of the frictional reduction mechanism. When the clutch pedal 21 is depressed it first releases both clutches 7 and 17 and then, through the consequent movement of the connecting rod 22 and lever 39, actuated the wedge member 37 to move the several frictional discs and pinions into engagement and thereby connect the gears 3 and 4 with the propeller shaft 18 and rotate said gears slowly thereby further facilitating their engagement, when shifted, with the then stationary gears 10 or 11.

It is obvious that when both motor and vehicle are in motion that it may be desired to shift directly from high to low gear, or from low to high. In the present practice the difference of speed of rotation between the two sets of variable speed gears is too great to readily permit a shift of that type. This may be accomplished, however, with the present mechanism now in use, by speeding up the motor with the clutch engaged and the gear shift in neutral and then when the gears 10 or 11 have assumed or been given the proper speed, the gears may be shifted directly from low to high or vice versa. But unless one is sufficiently skilled and experienced in making such a shift the result is merely a damaging clashing of gears without effecting a proper shifting. With the present invention, however, the gears may be shifted, even into reverse if desired, as all of the gears may be stopped entirely by depressing the clutch pedal a sufficient distance to merely disengage the variable speed gears, or the gears 3 and 4 may be rotated very slowly, at a greatly reduced speed through the propeller shaft 18 by depressing the clutch pedal 21 a sufficient distance to bring the frictional driving mechanism into operation.

Having thus described our invention what we claim as new and desire to secure by Letters Patent is:—

1. The combination with a motor vehicle transmission and clutch thereof, of a second clutch arranged between said transmission and the propeller shaft of a motor vehicle whereby the variable speed gears of said transmission may be disconnected from said motor and propeller shaft to prevent rotation of said gears, when either said vehicle or the motor thereof is in operation, whereby shifting of said gears may be facilitated; means for rotating said gears at a low rate of speed when disconnected from said motor and propeller shaft; and means for simultaneously actuating both clutches and then actuating the gear rotating means.

2. The combination with a motor vehicle and the transmission and clutch thereof, of a second clutch interposed between said transmission and the propeller shaft of said vehicle whereby rotation of the variable speed gears of said transmission may be prevented when either the motor or vehicle is in operation; reduction mechanism arranged to slowly rotate said transmission gears and normally disconnected therefrom; and means for first actuating both clutches simultaneously to disconnect the said gears from said motor and propeller shaft to prevent rapid rotation of said gears relatively to each other and then actuate the gear rotating means mentioned to rotate the gears slowly to facilitate shifting of said gears.

3. The combination with a motor vehicle and the transmission and clutch thereof, of a second clutch interposed between said transmission and the propeller shaft of said vehicle whereby rotation of the variable speed gears of said transmission may be prevented when both clutches are disengaged; a speed reduction means connecting said variable speed gears with the propeller shaft of the vehicle but normally disconnected from said gears; and means for first actuating the clutches simultaneously to disconnect said variable speed gears from the motor and propeller shaft of said vehicle and then connecting the speed reduction means between said propeller shaft and transmission gears to rotate said gears slowly to facilitate shifting of the same.

4. The combination with a motor vehicle and the transmission and clutch thereof, of a second clutch interposed between the said transmission and the propeller shaft of said vehicle whereby rotation of the variable speed gears of said transmission may be prevented when either vehicle or motor thereof is in operation; frictional speed reducing means arranged to connect the variable speed gears with the propeller shaft of the vehicle whereby said variable speed gears may be rotated slowly when the vehicle is in motion; and means for first simultaneously actuating both clutches to disconnect the variable speed gears from the motor and vehicle to prevent rapid rotation of said gears, and then actuating the frictional speed reducing means whereby said variable speed gears may be rotated slowly to facilitate shifting of said gears.

In witness whereof we hereunto set our signatures.

HARRY A. HANSON.
VICTOR F. ZOHODIAKIN.